US008466662B2

(12) United States Patent
Nania et al.

(10) Patent No.: US 8,466,662 B2
(45) Date of Patent: Jun. 18, 2013

(54) POWER TRANSFER BETWEEN INDEPENDENT POWER PORTS UTILIZING A SINGLE TRANSFORMER

(75) Inventors: Ionut Adrian Nania, San Jose, CA (US); Cristina Nania, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 330 days.

(21) Appl. No.: 12/907,820

(22) Filed: Oct. 19, 2010

(65) Prior Publication Data

US 2012/0092903 A1    Apr. 19, 2012

(51) Int. Cl.
 G05F 1/70    (2006.01)
(52) U.S. Cl.
 USPC .......................................................... 323/207
(58) Field of Classification Search
 USPC ............. 323/205, 207; 307/82; 713/300–340; 363/15, 34
 See application file for complete search history.

(56) References Cited

U.S. PATENT DOCUMENTS

| | | | |
|---|---|---|---|
| 6,556,097 B2 * | 4/2003 | Coffey | 333/24 R |
| 6,894,461 B1 * | 5/2005 | Hack et al. | 323/205 |
| 7,348,767 B2 * | 3/2008 | Hack et al. | 323/316 |
| 7,363,525 B2 * | 4/2008 | Biederman et al. | 713/340 |
| 7,538,532 B2 * | 5/2009 | Hack et al. | 323/284 |
| 7,586,840 B2 * | 9/2009 | Karam | 370/216 |
| 7,710,085 B2 * | 5/2010 | Park et al. | 323/251 |
| 7,788,518 B2 * | 8/2010 | Biederman et al. | 713/340 |
| RE43,572 E * | 8/2012 | West | 307/64 |
| 8,242,782 B2 * | 8/2012 | Brannan et al. | 324/415 |
| 8,248,075 B2 * | 8/2012 | Brannan et al. | 324/415 |
| 8,300,426 B2 * | 10/2012 | Alexander | 363/17 |
| 2006/0227028 A1 * | 10/2006 | Balogh et al. | 341/144 |
| 2007/0271383 A1 * | 11/2007 | Kim et al. | 709/227 |
| 2010/0082083 A1 * | 4/2010 | Brannan et al. | 607/102 |

OTHER PUBLICATIONS

Hui Li; Danwei Liu, Peng, F. Z.; Gui-Jia Su; "Small Signal Analysis of A Dual Half Bridge Isolated ZVS Bi-directional DC-DC converter for Electrical Vehicle Applications," *Power Electronics Specialists Conference*, 2005. PESC '05 IEEE 36th, vol., No., pp. 2777-2782, Jun. 16-16, 2005.

Zhijun Qian; Abdel-Rahman, O.; Reese, J.; Al-Atrash, H.; Batarseh, I.; "Dynamic Analysis of Three-Port DC/DC Converter for Space Applications," *Applied Power Electronics Conference and Exposition*, 2009 APEC 2009 Twenty-Fourth Annual IEEE, vol., No., pp. 28-34, Feb. 15-19, 2009.

(Continued)

*Primary Examiner* — Adolf Berhane
(74) *Attorney, Agent, or Firm* — Blakely Sokoloff Taylor & Zafman LLP

(57) ABSTRACT

An example power delivery network includes an energy transfer element, a main power port, and a main port interface. The energy transfer element includes multiple windings, where a first power converter transfers power between a first power port and a first winding, and a second power converter transfers power between a second winding and a second power port. The main port interface is coupled cyclically reverse a dc voltage received at the main power port and provides a cyclically reversed voltage to a third winding of the energy transfer element at a fixed duty ratio, where the transfer of power between the first power port and the first winding is independent of the transfer of power between the second winding and the second power port. Also, the main power port has an effective impedance less than an effective impedance of the first power port and the second power port.

31 Claims, 5 Drawing Sheets

OTHER PUBLICATIONS

Abu-Qahouq, J.A.; Hong Mao; Al-Atrash, H.J.; Batarseh, I.; "Maximum Efficiency Point Tracking (MEPT) Method and Digital Dead Time Control Implementation," *Power Electronics, IEEE Transactions on*, vol. 21, No. 5, pp. 1273-1281, Sep. 2006.

Al-Atrash, H.; Tian, F.; Batarseh, I.; "Tri-Modal Half-Bridge Converter Topology for Three-Port Interface," *Power Electronics, IEEE Transactions on*, vol. 22, No. 1, pp. 341-345, Jan. 2007.

Al-Atrash, H.; Batarseh, I.; "Digital Controller Design for a Practicing Power Electronics Engineer," *Applied Power Electronics Conference, APEC 2007—Twenty Second Annual IEEE*, vol., No., pp. 34-41, Feb. 25, 2007-Mar. 1, 2007.

Hong Mao; Abu-Qahouq, J.; Shiguo Luo; Batarseh, I.; "Zero-voltage-switching half-bridge DC-DC converter with modified PWM control method," *Power Electronics, IEEE Transactions on*, vol. 19, No. 4, pp. 947-958, Jul. 2004.

Hohm, D.P.; Ropp, M.E.; "Comparative study of maximum power point tracking algorithms using an experimental, programmable, maximum power point tracking test bed," *Photovoltaic Specialists Conference, 2000 Conference Record of the Twenty-Eighth IEEE*, vol., No., pp. 1699-1702, 2000.

Hussam Al-Atrash; Michael Pepper; Issa Batarseh; "A Zero-Voltage Switching Three-Port Isolated Full-Bridge Converter," *Telecommunications Energy Conference, 2006. INTELEC '06. 28th Annual International*, vol., no., pp. 1-8, Sep. 2006.

Al-Atrash, H.; Batarseh, I.; "Boost-Integrated Phase-Shift Full-Bridge Converter for Three-Port Interface," *Power Electronics Specialists Conference, 2007. PESC 2007. IEEE*, vol., No., pp. 2313-2321, Jun. 17-21, 2007.

Wenkai Wu; Pongratananukul, N.; Weihong Qiu; Rustom, K.; Kasparis, T.; Batarseh, I.; "DSP-based multiple peak power tracking for expandable power system," *Applied Power Electronics Conference and Exposition, 2003. APEC '03. Eighteenth Annual IEEE*, vol. 1, No., pp. 525-530 vol. 1, Feb. 9-13, 2003.

Rohatgi, A.; Durgin, G.D.; "Implementation of an Anti-Collision Differential-Offset Spread Spectrum RFID System," *Antennas and Propagation Society International Symposium 2006, IEEE*, vol., No., pp. 3501-3504, Jul. 9-14, 2006.

* cited by examiner

POWER TRANSFER BETWEEN INDEPENDENT POWER PORTS UTILIZING A SINGLE TRANSFORMER

TECHNICAL FIELD

The present invention relates generally to power ports, and more specifically to power transfer between multiple power ports.

BACKGROUND INFORMATION

Power delivery systems typically transfer power to and from multiple locations. Such example systems are solar power delivery systems and automotive power processing systems. One example of a solar power delivery system would be the solar power delivery system utilized for home consumption. A photovoltaic (PV) cell converts the energy from received sunlight into electrical power. The power delivery system then transfers the electrical power to various locations around the home. Power may be transferred from a PV cell to a battery for power storage. In addition, power may be converted to the high voltage ac used for conventional wall sockets to power electronic devices. Typically, current systems use at least two independent devices which are used to transfer power in the solar power delivery system. One device, called a maximum power point tracker (MPPT), transfers power from a PV cell to a battery. The MPPT is a dc to dc power converter which extracts the optimum power from the PV cell. The solar power delivery system utilizes another device, a power inverter, which converts energy from the battery to the high voltage ac used for the power grid. A power inverter is a dc to ac power converter and is typically also a bidirectional power converter.

The power inverter may have multiple high voltage ac or dc outputs and inputs, each may have a different phase, amplitude, and/or frequency (50 Hz, 60 Hz, 100 Hz, single phase, slit-phase, or tri-phase) from the other. Internally, the power inverter utilizes one transformer for every high voltage isolated ac output. The MPPT mentioned above also internally utilizes an energy transfer element, such as an inductor or transformer. For a typical solar power delivery system having a PV cell, one battery and one high voltage ac output, two separate products each having their own transformer would be utilized. In addition, for every additional output of the power inverter, another transformer would be utilized. Two separate products add additional costs and result in greater size and weight to the power delivery system. Additional transformers also add additional cost, size, and weight to the power delivery system.

Others have attempted to combine the MPPT, multiple power inverters, or other power conversion systems into a single product with a single energy transfer element, such as a transformer, to reduce cost and size of the device. A power delivery system with a single energy transfer element which transfers energy to and from multiple locations is herein referred to as multiple power port conversion (MPPC). However, implementing MPPC for a power deliver system has many challenges and obstacles, namely, implementing the control loops for different locations connected to the single energy transfer element. For example, a MPPC system with 3 locations (also referred to as ports) transferring power between the first and second location would need to take into account the effects of the power transfer to the third location because the locations share a common path through the energy transfer element. As such, the control signal controlling power to or from the third location would offset the effects of the power transfer between the first and second location. The same can be said for power transfer between the first and third location and the effects to the second location. As such, the control techniques for each individual power port can become very complex when more power ports are connected to the energy transfer element. As such, the number of power ports which can be connected to the energy transfer element is limited due to the complex control loops generated for each port. Because of this, typical MPPC systems are limited to no more than three power ports.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
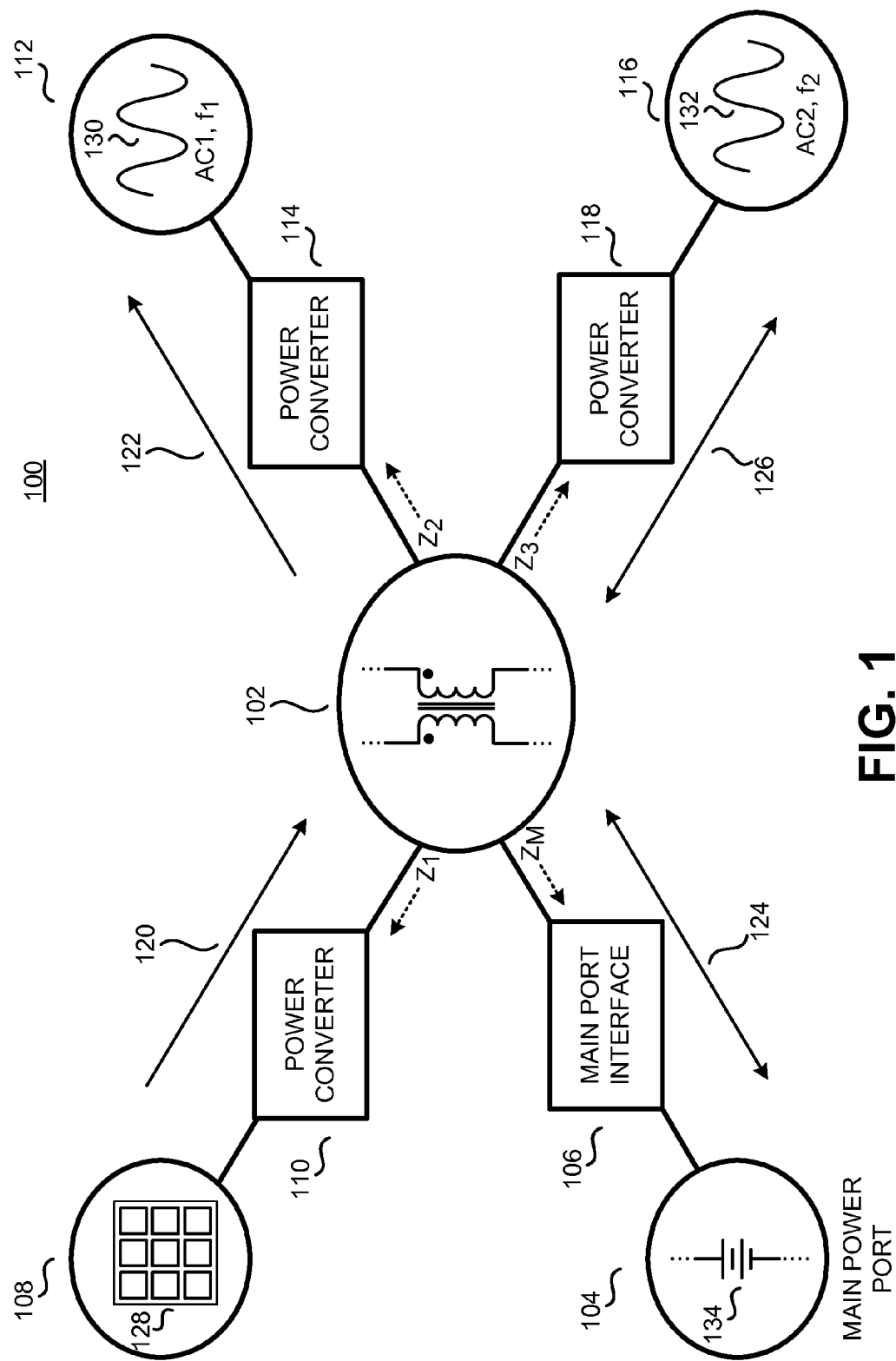
FIG. 1 is a functional block diagram illustrating a power delivery system, in accordance with an embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Embodiments for power transfer between independent power ports are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

Conventional power delivery systems typically use separate devices (and therefore separate energy transfer elements) to transfer power to and from multiple locations/ports. Multiple power ports may be coupled together to transfer energy between several power ports, also referred to herein as multiple port power conversion (MPPC). A power port is an input and/or output location of power delivery and/or power retrieval. In other words, a power port is a location where power may be received, supplied, or both. Power ports may be coupled to the energy transfer element through power converters which control the power transfer between the power port and the transformer. A single transformer may be used to transfer power from one power port to another power port. Currently, one of the obstacles for implementing MPPC is that the control loops for different power ports share a common path through the same magnetic circuit (i.e. the transformer). A control signal which regulates one power path (the path from one power port to another power port) would influence another power path since the transformer is shared by both power ports. As more power ports are connected to the same magnetic circuit, there are more power paths which add to the complexity of regulating a single power path. As a result, many MPPC systems are limited to 3 power ports to avoid further complexity.

Power transfer between the power port and the energy transfer element may be unidirectional or bidirectional. In other words, the power converters may be unidirectional or bidirectional. Unidirectional power ports may either supply power or receive power. On the other hand, bidirectional power ports can both supply power and receive power. In a power delivery system, several power ports may be coupled together to transfer power from one power port to another.

Embodiments of the present invention provide a MPPC system which implements N number of power ports coupled to a single magnetic device, such as a transformer, which utilizes a low impedance power port. Embodiments of the present invention may also utilize a unique modulation scheme for the simplification of at least one bidirectional power port. One aspect of the present invention is a spatial topology which allows each power port to function independently of another power port. As a result, the power transfer between a power port and the transformer is independent of the transfer of power between other power ports and the transformer. The low impedance power port may be referred to as the main power port. An example of a low impedance power port would be a battery coupled to the energy transfer element, i.e. the transformer, without an inductor coupled there between. In addition, other power ports may be coupled to the energy transfer element through a respective power converter which includes an inductor and has higher impedance than the main power port. As a result, even though there are multiple power ports connected to the energy transfer element, it appears as if each power port is connected to only a single spatially switched battery. This allows the power transfer between a power port and the energy transfer element to be independent from the power transfer of other power ports and the energy transfer element.

Referring first to FIG. 1, a functional block diagram of an example power delivery system 100 is illustrated as having a power delivery network that includes an energy transfer element 102, a main power port 104, a main port interface 106, a first power port 108, a first power converter 110, a second power port 112, a second power converter 114, a third power port 116, and a third power converter 118.

The power delivery system 100 facilitates transfer to and from various power ports. As illustrated, the energy transfer element 102 is coupled to the main power port 104 through the main port interface 106. In addition, the first power port 108 may couple to the energy transfer element 102 through the first power converter 110. The second power port 112 may couple to the energy transfer element 102 through the second power converter 114 and the third power port 116 may couple to the energy transfer element 102 through third power converter 118.

The power converters shown in FIG. 1 facilitate the power transfer between the power port and the energy transfer element. The first power port 108 is an example of a unidirectional power port. The power is supplied by the first power port 108 and is transferred to the energy transfer element 102 (as illustrated by direction arrow 120). As such, the first power converter 110 is a unidirectional power converter with the first power port 108 coupled to an input of power converter 110 and the energy transfer element 102 coupled to an output of power converter 110. In one example, the input of the first power converter 110 is a dc voltage input and the output is a switched voltage. A switched voltage may be a voltage that alternates in polarity. As such, the first power converter 110 may be a dc to switched voltage converter. In the example shown in FIG. 1, the first power port 108 is to be coupled to receive power from an electrical power generator, such as, photovoltaic (PV) cell 128. One example of the power converter 110 may be a power inverter as mentioned above.

Further shown in FIG. 1, the second power port 112 is a unidirectional power port. However, power is received by the second power port 112 from the energy transfer element 102 (as shown by direction arrow 122). The second power converter 114 is a unidirectional power converter with the energy transfer element 102 coupled to an input of second power converter 114 and the second power port 112 coupled to an output of second power converter 114. In the example shown in FIG. 1, the second power port 112 is to be coupled to provide power to a load by way of an output such as ac voltage (AC1) 130 with a frequency of $f_1$.

The third power port 116 is an example of a bidirectional power port. In other words, the third power port 116 may supply power to the energy transfer element 102 or receive power from the energy transfer element 102 (as shown by direction arrow 126). Third power converter 118 is a bidirectional power converter which couples to the energy transfer element 102 on one end of power converter 118 and to the third power port 116 on the other end of power converter 118. In the example shown in FIG. 1, the third power port 116 is to be coupled to a source of power such as ac voltage line (AC2) 132 with a frequency of $f_2$.

While the example of FIG. 1 illustrates three power ports (108, 112, and 116) and a main power port 104, it should be appreciated that any number of power ports may be coupled to the energy transfer element 102. In addition, it should be appreciated that the power ports may be any combination of unidirectional or bidirectional power ports. Further, the power delivery system 100 may also have more than one main power port and main port interface. As mentioned above, a power port is a location where power may be received or supplied from. In one embodiment, at least one of the power ports 108, 112, 116 and 104 may include conductive elements for joining to a device external to the power delivery network.

For example, power port 108 may include wires, terminals, or connectors for electrically and/or physically coupling to PV cell 128. A power port may supply or receive power to/from a variety of devices external to power delivery network. For example, power ports may be coupled to a high voltage ac (such as the high voltage ac used for conventional wall sockets), a dc voltage source (such as a battery), a photovoltaic cell, etc. Another example of a power delivery system would be recreational vehicle (RV) ac generators with multiple triphase ac outputs, a battery backup and a diesel generator. In addition, the power converters illustrated in FIG. 1 may be any type of power converter, such as an ac-to-dc power converter, a dc-to-ac power converter, dc-to-dc power converter, ac-to-ac power converter, step-up converters, step-down converters, etc.

Also illustrated in FIG. 1 is main power port 104. Main power port 104 is a bidirectional power port (as shown by direction arrow 124) and may supply power to the energy transfer element 102 or receive power from the energy transfer element 102. Main power port 104 is a low impedance power port. In other words, the effective impedance $Z_M$ of main power port 104 is lower than the effective impedance of any of the other power ports (i.e., $Z_M < Z_1$, $Z_M < Z_2$, $Z_M < Z_3$, etc). For some embodiments, the effective impedance $Z_M$ may be significantly lower than the effective impedance of any of the other power ports. In one example, the effective impedance $Z_M$ of the main power port is substantially zero. In the embodiment where power delivery system 100 includes multiple main power ports and a corresponding number of main port interfaces, each of the main power ports may have a similar or equal effective impedance $Z_M$, where the effective impedance $Z_M$ is less than the effective impedance of any of the other non-main power ports included in the power delivery system 100. As shown in FIG. 1, the main power port 104 is coupled to a dc voltage source, such as an energy storage element (battery 134, storage capacitor, or supercapacitor). As mentioned above, conventional multiple port power conversion (MPPC) systems have difficulty implementing more than three power ports due to the complexity of controlling the power transfer from the power port to the energy transfer element due to the shared magnetic path of the energy transfer element. However, embodiments of the present invention utilizes the main power port 104 and the main port interface 106 such that the power transfer between any power port and the energy transfer element 102 is independent of the power transfer between the other power ports and the energy transfer element.

As will be further discussed, the main power port 104 may be coupled to a battery while the main port interface 106 may include a group of switches in a full bridge converter topology such that the voltage at the energy transfer element T1 102 toggles between a positive and negative voltage. In one embodiment, main port interface 106 operates as a spatially switched battery. As a result, even though the other power ports are connected to the energy transfer element 102, it appears as if each power port is connected to only a spatially switched battery. This allows the power transfer between any of the power ports and the energy transfer element 102 to be independent from the power transfer of other power ports and the energy transfer element 102. In addition, the main power port 104 has the capability to receive excess power from a power port or supply extra power to a power port.

For example, the first power port 108 may supply 10 kilowatts (kW) of power to the energy transfer element 102. At the same, time the second power port 112 wishes to receive 10 kW of power. The second power port 112 receives 10 kW of power from the first power port 108 through the energy transfer element 102. In embodiments of the present invention, the overall power transfer of the main power port 104 is 0 kW. As such, the transfer of the 10 kW of power may be considered a direct power transfer from the first power port 108 to the second power port 112 with zero power transfer through the main power port 104.

In another example, the main power port 104 may simultaneously receive power while power is supplied to multiple power ports. The first power port 108 may supply 10 kW of power to the energy transfer element 102 and the main power port 104 receives 1 kW of excess power from the energy transfer element 102 when both the second power converter 112 and the third power converter 116 wish to receive 6 kW and 3 kW, respectively. In embodiments of the present invention, the main power port 104 receives 1 kW from the first power port 108 through the energy transfer element 102 and the second power port 112 receives the 6 kW through the energy transfer element 102. At substantially the same time, the third power converter 116 receives the 3 kW directly from the first power port 108 through the energy transfer element 102.

The main power port may handle excess power transfer from any power port. The first power port 108 may supply 10 kW of power through the energy transfer element 102 and the second power port 112 wishes to receive 2 kW of power. The second power port 112 receives 2 kW of power from the first power port 108 through the energy transfer element 102 while the main power port 104 receives the excess 8 kW from the first power port 108 through the energy transfer element 102. Battery 134 may be coupled to main power port 104 to store the excess 8 kW which may later be supplied to any power port.

As mentioned above, the main power port 104 may also supply energy when needed. For example, the second power port 112 may wish to receive 10 kW of power while the first power port 108 is able to supply 8 kW of power. If the main power port 104 has stored enough energy, the main power port 104 may supply the remaining 2 kW of power to the second power port 112. The second power port 112 would receive 8 kW of power from the first power port 108 through energy transfer element 102 and 2 kW from the main power port 104 through energy transfer element 102.

Figure 2:
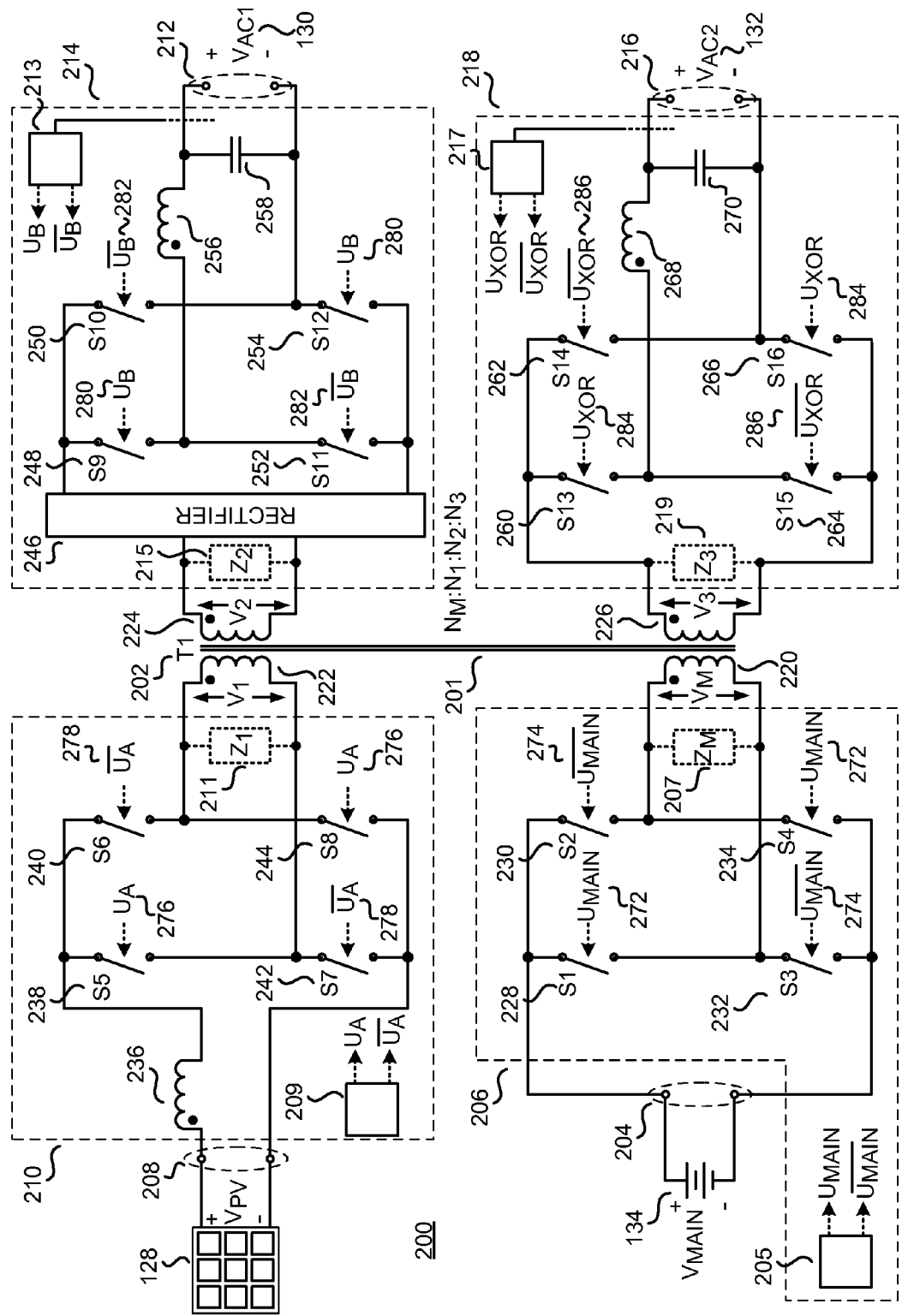
FIG. 2 is a circuit diagram illustrating an example power delivery system, in accordance with an embodiment of the present invention.

FIG. 2 illustrates an example circuit diagram of a power delivery system 200 having a power delivery network that includes energy transfer element T1 202, main power port 204, main port interface 206, a first power port 208, a first power converter 210, a second power port 212, a second power converter 214, a third power port 216, and a third power converter 218. The energy transfer element T1 202 includes a single magnetic core 201, a main winding 220, a first winding 222, a second winding 224, and a third winding 226. The main port interface 206 includes a controller 205, switch S1 228, switch S2 230, switch S3 232, and switch S4 234. The first power converter 210 includes a controller 209, inductor 236, switch S5 238, switch S6 240, switch S7 242, and switch S8 244. Second power converter 214 includes a controller 213, rectifier 246, switch S9 248, switch S10 250, switch S11 252, switch S12 254, inductor 256, and capacitor 258. The third power converter 218 includes a controller 217, switch S13 260, switch S14 262, switch S15 264, switch S16 266, inductor 268, and capacitor 270. Also illustrated in FIG. 2 are main drive signal $U_{MAIN}$ 272, inverted main drive signal $\overline{U_{MAIN}}$ 274, first drive signal $U_A$ 276, inverted first drive signal $\overline{U_A}$ 278, second drive signal $U_B$ 280, second inverted drive signal $\overline{U_B}$ 282, third drive signal $U_{XOR}$ 284, and inverted third drive signal $\overline{U_{XOR}}$ 286.

The power delivery system 200 shown in FIG. 2 transfers power to and from several power ports coupled to the energy transfer element T1 202. As illustrated, the main power port 204 is coupled to battery 134, which provides a dc voltage, main voltage $V_{MAIN}$. The main power port 204 is coupled to the energy transfer element T1 202 through the main port interface 206. In one example, the energy transfer element T1 202 is a transformer with several windings. As illustrated in FIG. 1, the energy transfer element T1 202 has four windings, 220, 222, 224, and 226, magnetically coupled to one another via single magnetic core 201. Even though FIG. 2 illustrates energy transfer element T1 202 as having four windings, it is appreciated that any number of windings may be utilized. The main port interface 206 comprises switches S1 228, S2 230, S3 232, and S4 234 coupled together in an H-bridge. As shown, the positive end of the main power port 204 is coupled to one end of switches S1 228 and S2 230. The negative end of the main power port 204 is coupled to one end of switches S3 232 and S4 234. In addition, one end of the main winding 220 is coupled to the other end of switch S2 230 while the other end of main winding 220 is coupled to the other end of switch S3 232. In other words, one end of main winding 220 is coupled to a node between switch S2 230 and S4 234. The other end of main winding 220 is coupled to a node between switch S1 228 and S3 232.

Switch S1 228 and switch S4 234 are coupled to receive the main drive signal $U_{MAIN}$ 272 generated by controller 205. An example of controller 205 providing the main drive signal $U_{MAIN}$ 272 is illustrated with respect to FIG. 3. Switches S1 228 and S4 234 are opened and closed in response to the main drive signal $U_{MAIN}$ 272. It is generally understood that a switch that is closed may conduct current and is considered on, while a switch that is open cannot conduct current and is considered off. Main drive signal $U_{MAIN}$ 272 is a rectangular pulse waveform with logic high and logic low sections.

In one embodiment the transfer of power between main power port 204 and winding 220 of energy transfer element 202 is independent of the individual transfer of power between any of the other power ports and energy transfer element 202. However, it should be appreciated that the main power port 204 is handling the deficit of or excess of power. In other words, the main power port 204 is delivering or storing extra power. The total sum of power received by the energy transfer element 202 is equal to the sum of power supplied by the energy transfer element 202. For example, controller 205 may be included in power converter 206 such that no feedback information is received at controller 205 about any of the other ports (i.e., 208, 212, 216), power converters (210, 214, 218), or winding voltages (i.e., $V_1, V_2, V_3$). Instead, controller 205 may generate the main drive signal $U_{MAIN}$ 272 to have a duty ratio that is fixed. For example, main drive signal $U_{MAIN}$ 272 may have a duty ratio that is fixed to substantially 50%. In other words, the logic high and logic low sections are of substantially equal length. Main drive signal $U_{MAIN}$ 272 may also have a fixed frequency. For the example illustrated in FIG. 2, when the main drive signal $U_{MAIN}$ 272 is logic high, switches S1 228 and S4 234 are closed. When the main drive signal $U_{MAIN}$ 272 is logic low, switches S1 228 and S4 234 are open. Although FIG. 2 illustrates switch S1 228 and switch S4 234 as receiving the main drive signal $U_{MAIN}$ 272 from a single controller 205, each switch may also receive $U_{MAIN}$ 272 from separate drivers.

In the illustrated example of FIG. 2, switch S2 230 and switch S3 232 receive the inverted main drive signal $\overline{U_{MAIN}}$ 274 generated by controller 205. Switches S2 230 and S3 232 are opened and closed in response to the inverted main drive signal $\overline{U_{MAIN}}$ 274. When main drive signal $U_{MAIN}$ 272 is logic high, inverted main drive signal $\overline{U_{MAIN}}$ 274 is logic low and vice versa. Although FIG. 2 illustrates switch S2 230 and switch S3 232 as receiving the inverted main drive signal $\overline{U_{MAIN}}$ 274 from a single controller 205, alternatively, one driver may be used to generate signal $U_{MAIN}$ 272 while another driver is used to generate $\overline{U_{MAIN}}$ 274. Even still, four separate drivers may be used for generating a respective drive signal for each switch. As mentioned above, switches S1 228, S2 230, S3 232, and S4 234 are coupled together in an H-bridge configuration. As such, switches S1 228 and S4 234 are opened and closed as a pair and switches S2 230 and S3 232 are also opened and closed as a pair. In addition, when switches S1 228 and S4 234 are open, switches S2 230 and S3 232 are closed and vice versa.

In operation, when switches S1 228 and S4 234 are closed, the second power port 204 is coupled such that a negative main voltage $V_{MAIN}$ 204 is applied to main winding 220. When switches S2 230 and S3 232 are closed, the second power port 204 is coupled such that a positive main voltage $V_{MAIN}$ 204 is applied to the main winding 220. As such, the voltage $V_M$ on the main winding 220 is the cyclically reversed main voltage $V_{MAIN}$ 204. For example:

$$V_M = +V_{MAIN} \quad (1)$$

when switches S2 230 and S3 234 are closed and S1 228 and S4 234 are open, and:

$$V_M = -V_{MAIN} \quad (2)$$

when switches S1 228 and S4 234 are closed and switches S2 230 and S3 234 are open.

The duty ratio of the main drive signal $U_{MAIN}$ 272 determines how long the voltage $V_M$ on the main winding 220 is positive main voltage $+V_{MAIN}$ 204 and how long the voltage $V_M$ on the main winding 220 is negative main voltage $-V_{MAIN}$ 204. When the duty ratio of main drive signal $U_{MAIN}$ 272 is substantially 50%, the duty ratio determines equal transitions of the voltage $V_M$ on the main winding 220 from a positive main voltage $+V_{MAIN}$ 204 and a negative main voltage $-V_{MAIN}$ 204. As illustrated in FIG. 2, the main power port 204 is the lowest impendence port since the main port interface 206 does not include an inductor while power converters 210, 214, and 218 do include an inductor. As will be further discussed, voltages proportional to the voltage $V_M$ on main winding 220 appear on the first winding 222, second winding 224, and third winding 226. Since the main power port 204 is the lowest impedance power port, the voltage on the first winding 222 is determined by the operation of the main port interface 206 and main power port 204. Further, the voltage on the second winding 224 and the voltage on the third winding 226 is determined by the operation of the main port interface 206 and main power port 204.

Also illustrated in FIG. 2 is the first power port 208. In one example, the first power port 208 is coupled to photovoltaic (PV) cell 128 having a dc voltage, PV voltage $V_{PV}$. The first power port 208 couples to the first winding 222 of the energy transfer element T1 through the first power converter 210. The first power port 208 is a unidirectional power port and supplies power to the energy transfer element T1 202. The first power converter 210 includes switches S5 238, S6 240, S7 242, and S8 244 coupled together in an H-bridge. Further included in the first power converter 210 is the inductor 236.

As shown, the positive end of the first power port 208 is coupled to one end of the inductor 236 while the negative end of the first power port 208 is coupled to one end of switches S7 242 and S8 244. The other end of inductor 236 is then coupled to one end of switches S5 238 and S6 240. In the example shown, one end of the first winding 222 is coupled to the other end of switch S6 240 and the other end of the first winding 222 is coupled to the other end of switch S7 242. In other words, one end of the first winding 222 is coupled to a node between switch S6 240 and switch S8 244. The other end of first winding 222 is coupled to a node between switch S7 242 and switch S5 238.

Switch S5 238 and switch S8 244 are coupled to receive the first drive signal $U_A$ 276 generated by controller 209. Switches S5 238 and S8 244 are opened and closed in response to the first drive signal $U_A$ 276. First drive signal $U_A$ 276 is a rectangular pulse waveform with logic high and logic low sections. In one embodiment, when the first drive signal $U_A$ 276 is logic high, switches S5 238 and S8 244 are closed. When the first drive signal $U_A$ 276 is logic low, switches S5 238 and S8 244 are open. Although FIG. 2 illustrates switches S5 238 and S8 244 as receiving the first drive signal $U_A$ 276 from a single controller 209, each switch may instead receive the first drive signal $U_A$ 276 from separate drivers.

Switch S6 240 and switch S7 242 receive the inverted first drive signal $\overline{U_A}$ 278 generated by controller 209. Switches S6 240 and S7 242 are opened and closed in response to the inverted first drive signal $\overline{U_A}$ 278. When the first drive signal $U_A$ 276 is logic high, the inverted first drive signal $\overline{U_A}$ 278 is logic low and vice versa. Although FIG. 2 illustrates switches S6 240 and S7 242 as both receiving the inverted first drive signal $\overline{U_A}$ 278 from controller 209, alternatively, one driver may be used to generate the first drive signal $U_A$ 276, while another driver is used to generate the inverted drive signal $\overline{U_A}$ 278. Even still, a separate driver may be utilized for each switch. In one embodiment, the duty ratio of the first drive signal $U_A$ 276 and the inverted drive signal $\overline{U_A}$ 278 is a pulse width modulated (PWM) signal. In another embodiment, the duty ratio of the first drive signal $U_A$ 276 and the inverted drive signal $\overline{U_A}$ 278 is fixed and further, the frequency of the first drive signal $U_A$ 276 and the inverted drive signal $\overline{U_A}$ 278 may also be fixed. In another embodiment, the duty ratio of the first drive signal $U_A$ 276 is substantially the same as the duty ratio of the main drive signal $U_{MAIN}$ 272. As mentioned above, switches S5 238, S6 240, S7 242, and S8 244 are coupled together in an H-bridge. As such, for PWM control, switches S5 238 and S8 244 are opened and closed as a pair and switches S6 240 and S7 242 are opened and closed as a pair. In addition, when switches S5 238 and S8 244 are open, switches S6 240 and S7 242 are closed and vice versa. In accordance with embodiments of the present invention, the switches could be controlled to implement buck or boost functions from the PV cell 128 and the first power port 208 to the energy transfer element 202. Although the example illustrates PWM control techniques, it should be understood that other modulation techniques could be utilized, such as phase shift modulation. In addition, controller 209 and first power converter 210 could combine multiple functions such as voltage or current mode control combined with MPPT functions.

As mentioned above, the voltage on the first winding 222 is proportional to the voltage $V_M$ of main winding 220. As discussed above, the main winding 220 reverses polarity between a positive main voltage $+V_{MAIN}$ and negative main voltage $-V_{MAIN}$. Due to the effective impedance $Z_M$ being lower than the effective impedance of any of the other power ports, the voltage on the first winding 222 reverses polarity between a voltage proportional to a positive main voltage $+V_{MAIN}$ and a voltage proportional to the negative main voltage $-V_{MAIN}$. The proportionality is due to the ratio between the number of turns of the first winding 222 and the number of turns of the main winding 220:

$$V_1 = \frac{N_1}{N_M} V_M \quad (3)$$

where $V_1$ is the voltage on the first winding 222, $N_1$ is the number of turns of the first winding 222, $N_M$ is the number of turns of the main winding 220, and $V_M$ is the voltage on the main winding 220.

In one embodiment the transfer of power between first power port 208 and winding 222 of energy transfer element 202 is independent of the transfer of power between any of the other power ports and energy transfer element 202. For example, controller 209 may be included in power converter 210 such that no feedback information is received at controller 209 about the instant state of any of the other ports (i.e., 204, 212, 216), power converters (206, 214, 218), or winding voltages (i.e., $V_M$, $V_2$, $V_3$). In operation, the first power converter 210 converts the PV voltage $V_{PV}$ 208 of the first power port to a current injected directly into the low impedance of main winding 220 (as shown in equation 3). In one example, the first power converter 210 operates such that a dc current from the PV cell 128 is injected by the H-bridge comprising switches S5 238, S6 240, S7 242, and S8 248. Similar to the H-bridge in the main port interface 206, switches S5 238, S6 240, S7 242, and S8 248 are opened and closed such that a switched current is injected the first winding 222. In one embodiment, first power converter 210 operates as a maximum power point tracker (MPPT) combined with a buck-boost power converter.

Further illustrated in FIG. 2 is the second power port 212. As illustrated, the second power port 212 is generating the ac voltage $V_{AC1}$ 130 having frequency $f_1$ to a load (not shown). In one example, the second power port 212 may deliver the high voltage ac typically used in conventional wall sockets. The second power port 212 is coupled to the second winding 224 of the energy transfer element T1 202 through the second power converter 214. The second power port 212 is a unidirectional power port and receives energy from the energy transfer element T1 202. The second power converter 214 includes rectifier 246 and switches S9 248, S10 250, S11 252 and S12 254 coupled together in an H-bridge. Further included in the second power converter 214 is the inductor 256 and capacitor 258.

As shown, rectifier 246 couples to the second winding 224 of the energy transfer element T1 202. The rectifier 246 receives the voltage on the second winding 224 and outputs a rectified dc voltage. The rectifier 246 is further coupled to the H-bridge comprised of switches S9 248, S10 250, S11 252 and S12 254. Inductor 256 is coupled to a node between switch S9 248 and switch S11 252. The inductor 256 is further coupled to capacitor 258. The second power port 212 couples across capacitor 258. Capacitor 258 and second power port 212 couple to a node between switch S10 250 and switch S12 254. As illustrated, second power converter 214 is a unidirectional ac power converter.

Switch S9 248 and switch S12 254 receive the second drive signal $U_B$ 280 generated by controller 213. In one embodiment, controller 213 generates the second drive signal $U_B$ 280 in response to a feedback signal representative of ac voltage $V_{AC1}$ 130 to regulate the ac voltage $V_{AC1}$ 130 output by power converter 214. Switches S9 248 and S12 254 open and close in response to the second drive signal $U_B$ 280. Second drive signal $U_B$ 280 is also a rectangular pulse waveform with logic high and logic low sections. In one example, when the second drive signal $U_B$ 280 is logic high, switches S9 248 and S12 254 are closed. When the second drive signal $U_B$ 280 is logic low, switches S9 248 and S12 254 are open. Although FIG. 2 illustrates switches S9 248 and S12 254 as both receiving the second drive signal $U_B$ 280 from controller 213, each switch may instead receive the second drive signal $U_B$ 280 from separate drivers.

Switch S10 250 and S11 252 receive the inverted second drive signal $\overline{U_B}$ 282 generated by controller 213. Switches S10 250 and S11 252 open and close in response to the inverted second drive signal $\overline{U_B}$ 282. When the second drive signal $U_B$ 280 is logic high, inverted second drive signal $\overline{U_B}$ 282 is logic low and vice versa. Although FIG. 2 illustrates switches S10 250 and S11 252 as both receiving the inverted second drive signal $\overline{U_B}$ 282 from controller 209, alternatively, one driver may be used to generate second drive signal $U_B$ 280, while another driver is used to generate the inverted second drive signal $\overline{U_B}$ 282. Even still, a separate driver may be utilized for each switch. As mentioned above, switches S9 248, S10 250, S11 252 and S12 254 are coupled together in an H-bridge. As such, in one embodiment switches S9 248 and S12 254 are opened and closed as a pair and switches S10 250 and S11 252 are opened and closed as a pair. In addition, when switches S9 249 and S12 254 are open, switches S10 250 and S11 252 are closed and vice versa.

In one embodiment the transfer of power between second power port 212 and winding 224 of energy transfer element 202 is independent of the transfer of power between any of the other power ports and energy transfer element 202. For example, controller 213 may be included in power converter 214 such that no feedback information is received at controller 213 about the instant state of any of the other ports (i.e., 204, 208, 216), power converters (206, 210, 218), or winding voltages (i.e., $V_M$, $V_1$, $V_3$). In operation, the voltage $V_2$ on the second winding 224 is proportional to the voltage $V_M$ of main winding 220. As discussed above, the main winding 220 reverses polarity between a positive main voltage $+V_{MAIN}$ and a negative main voltage $-V_{MAIN}$. Due to the lower impedance $Z_M$ of the main power port 204, the voltage $V_2$ on the second winding 224 also reverses polarity between a voltage proportional to a positive main voltage $+V_{MAIN}$ and a voltage proportional to the negative main voltage $-V_{MAIN}$. The proportionality is due to the ratio between the number of turns of the second winding 224 and the number of turns of the main winding 220:

$$V_2 = \frac{N_2}{N_M} V_M \quad (4)$$

where $V_2$ is the voltage on the second winding 224 and $N_2$ is the number of turns of the second winding. In operation, the second power converter 214 converts the voltage $V_2$ on the second winding 224 to the high voltage ac $V_{AC1}$ 130 of the second power port 212.

FIG. 2 also illustrates the third power port 216. In one example, the third power port 216 is coupled to an ac voltage line 132 having an ac voltage $V_{AC2}$ and frequency $f_2$. The high voltage ac line 132, coupled to the third power port 216, can be one example of a power grid. The third power port 216 also couples to the third winding 226 of energy transfer element T1 202 through the third power converter 218. Third power port 216 is a bidirectional power port and may both supply and receive energy to and from the energy transfer element T1 202. The third power converter 218 includes switches S13 260, S14 262, S15 264, and S16 266 coupled together in an H-bridge. Switches S13 260, S14 262, S15 264, and S16 266 may be four quadrant switches. Further included in the third power converter 218 is inductor 268 and capacitor 270. As illustrated in FIG. 2, the third power converter 218 is a bidirectional ac power converter.

Typical bidirectional ac power converters can be separated into four stages. In the first stage, an ac voltage is converted to a dc voltage. In the second stage, the dc voltage is then converted to a switched voltage driving an energy transfer element (such as an isolation transformer). In general, the first stage is coupled to the ac line and the second stage is coupled to the energy transfer element (isolation transformer). There are also two stages on the other side of the energy transfer element with an equal number of switches, bulk capacitors, inductors, drivers, controllers, etc. which mirror the first two stages. Although the number of components per stage is a function of the various implementations of the stage, each stage can use up to eight switches to implement four equivalent converters: bidirectional ac-dc converter, bidirectional dc-dc converter, and/or a dc-ac converter. In the typical bidirectional power converter, this would equal up to 16 or 32 switches. Each switch typically has its own driver to control the switching of the switch which translates to 16 or 32 drivers for the conventional isolated bidirectional power port. The switches utilized in a conventional bidirectional power converter may be four-quadrant switches. In general, four-quadrant switches allows current to flow in both directions through the switch and the polarity of voltage across the switch may be positive or negative polarity. Four-quadrant switches may each include an n-type metal-oxide semiconductor field-effect transistor (MOSFET) coupled in series with another n-type MOSFET.

In a typical isolated bidirectional power converter the signal which controls the switches in the second stage may be referred to as the ac modulation signal since the outputs are coupled to an ac voltage line. Embodiments of the present invention utilize spatial modulation to simplify the typical isolated bidirectional power converter with an ac voltage line. As is discussed further, a single H-bridge is utilized in the bidirectional power port 218. However, the drive signal to control the switches of the H-bridge is a combination of the main drive signal $U_{MAIN}$ and the ac modulation signal. In embodiments of the present invention, the output of an exclusive-or (XOR) controls the switching of the switches in the bridge rectifier of the bidirectional third power converter 218. One input of the XOR is the ac modulation signal while the other input of the XOR is the main drive signal $U_{MAIN}$. Embodiments discussed utilize the main drive signal $U_{MAIN}$ 272 with an XOR-modulation scheme to simplify the bidirectional power converter to a single stage per side of the energy transfer element rather than two stages on each side of the energy transfer element for the conventional bidirectional power converter. Utilizing less switches also minimizes the number of controllers, drivers, filters, etc. for the power converter and decreases cost, size, and weight of the power delivery system and improves the efficiency of the power delivery system.

As shown, the third winding 226 couples to the H-bridge comprised of switches S13 260, S14 262, S15 264, and S16 266. One end of third winding 226 is coupled to one end of switches S13 260 and S14 262. The other end of third winding 226 is further coupled to one end of switches S15 264 and S16 266. The inductor 268 is coupled to a node between switches S13 260 and S15 264. The inductor is further coupled to capacitor 270. Third power port $V_{AC2}$ 216 is also coupled across capacitor 270. Capacitor 270 and the third power port 216 are further coupled to a node between switch S14 262 and switch S16 266. In the example shown, the third power converter 218 is part of a bidirectional and isolated ac power converter.

Switch S13 260 and switch S16 266 receive the third drive signal $U_{XOR}$ 284 generated by controller 217. In one embodiment, switches S13 260 and S16 266 open and close in response to the third drive signal $U_{XOR}$ 284. In one embodiment, controller 217 generates the third drive signal $U_{XOR}$ in response to a signal representative of the ac voltage $V_{AC2}$ 132 to control power transfer between the ac voltage source and the third winding 226. Third drive signal $U_{XOR}$ 284 is a rectangular pulse waveform with logic high and logic low sections. In one example, when the third drive signal $U_{XOR}$ 284 is logic high, switches S13 260 and S16 266 are closed. When the third drive signal $U_{XOR}$ 284 is logic low, switches S13 260 and S16 266 are open. Although FIG. 2 illustrates switches S13 260 and S16 266 as both receiving the third drive signal $U_{XOR}$ 284 from controller 217, each switch may instead receive the third drive signal $U_{XOR}$ 284 from separate drivers.

In one embodiment, switch S14 262 and switch S15 264 receive the inverted third drive signal $\overline{U_{XOR}}$ 286 generated by controller 217. Switches S14 262 and S15 264 open and close in response to the inverted third drive signal $\overline{U_{XOR}}$ 286. When the third drive signal $U_{XOR}$ 284 is logic high, inverted third drive signal $\overline{U_{XOR}}$ 286 is logic low and vice versa. Although FIG. 2 illustrates switches S14 262 and S15 264 as both receiving the inverted third drive signal $\overline{U_{XOR}}$ 286 from controller 217, alternatively one driver may be used to generate the third drive signal $U_{XOR}$ 284, while another driver is used to generate the inverted third drive signal $\overline{U_{XOR}}$ 286. Even still, a separate driver may be utilized for each switch. As mentioned above, switches S13 260, S14 262, S15 264, and S16 266 are coupled together in an H-bridge. In one embodiment, switches S13 260 and S16 266 are opened and closed as a pair and switches S14 262 and S15 264 are opened and closed as a pair. In addition, when switches S13 260 and S16 266 are open, switches S14 262 and S15 264 are closed and vice versa.

As will be further discussed below with respect to FIG. 5, the third power converter 218 may utilize an XOR-modulation scheme with a signal having the same duty ratio as the main drive signal $U_{MAIN}$ 272 to simplify the bidirectional power converter from two stages to a single stage. In embodiments of the present invention, the original drive signal for the third power converter 218 is modulated with a signal having the same duty ratio as the main drive signal $U_{MAIN}$ 272 to produce the third drive signal $U_{XOR}$ 284.

In one embodiment, the transfer of power between the third power port 216 and winding 226 of energy transfer element 202 is independent of the transfer of power between the first power port 208 and energy transfer element 202, and also independent of the transfer of power between second power port 212 and energy transfer element 202. The main power port 204 and main port interface 206 acts as an energy arbiter which receives any excess power or supplies extra power when there is a deficit of power. For example, controller 217 may be included in power converter 218 such that no feedback information is received at controller 217 about the instant state of any of the ports 204, 208, and 212, power converters 210 and 214, or main port interface 206. Voltage $V_3$ on the third winding 226 is proportional to the voltage $V_M$ of main winding 220. The main winding 220 reverses polarity between a positive main voltage $+V_{MAIN}$ and negative main voltage $-V_{MAIN}$. Due to the lower impedance $Z_M$ of the main power port 204, the voltage $V_3$ on the third winding 226 also reverses polarity between a voltage proportional to a positive main voltage $+V_{MAIN}$ and a voltage proportional to the negative main voltage $-V_{MAIN}$. The proportionality is due to the ratio between the number of turns of the third winding 226 and the number of turns of the main winding 220:

$$V_3 = \frac{N_3}{N_M} V_M \qquad (5)$$

where $V_3$ is the voltage on the third winding 226 and $N_3$ is the number of turns of the third winding 226. In operation, the third power converter 218 converts the voltage ($V_3$) on the third winding 226 to the ac voltage $V_{AC2}$ of the third power port 216.

Figure 3:
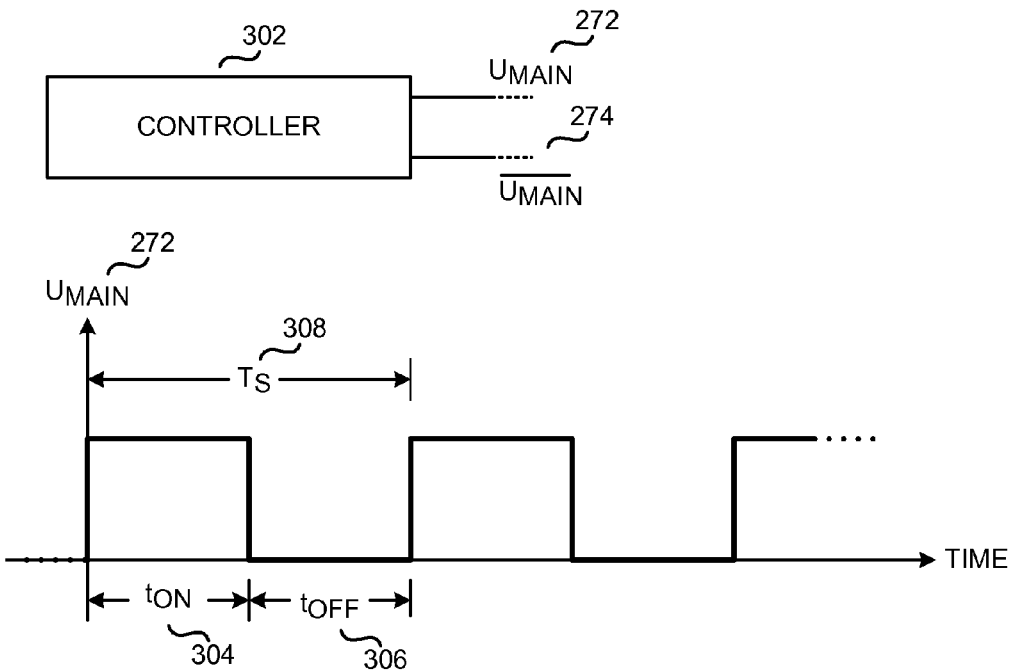
FIG. 3 is a waveform illustrating an example main drive signal for the power delivery system of FIG. 2, in accordance with an embodiment of the present invention.

FIG. 3 is a waveform illustrating an example main drive signal $U_{MAIN}$ 272 for the power delivery system of FIG. 2 including main drive signal $U_{MAIN}$ 272, inverted main drive signal $\overline{U_{MAIN}}$ 274, controller 302, on-time $t_{ON}$ 304, off-time $t_{OFF}$ 306, and switching period $T_S$ 308. As illustrated, the controller 302 provides both the main drive signal $U_{MAIN}$ 272 and the inverted main drive signal $\overline{U_{MAIN}}$ 274 to the switches indicated in FIG. 2. However, it should be appreciated that two separate drivers can supply the main drive signal $U_{MAIN}$ 272 and the inverted main drive signal $\overline{U_{MAIN}}$ 274.

As shown in FIG. 3, the main drive signal $U_{MAIN}$ 272 is a rectangular pulse waveform with logic high and logic low sections. The logic high sections have a length denoted as the on-time $t_{ON}$ 304 and the logic low sections have a length are denoted as the off-time $t_{OFF}$ 306. At the beginning of the on-time $t_{ON}$ 304, main drive signal $U_{MAIN}$ 272 pulses to a logic high value and remains at the logic high value for the remainder of the on-time $t_{ON}$ 304 and the switches that receive the main drive signal $U_{MAIN}$ 272 are closed. At the beginning of the off-time $t_{OFF}$ 306, the main drive signal $U_{MAIN}$ 272 transitions to the logic low value and remains at the logic low value for the remainder of the off-time $t_{OFF}$ 306 and the switches that receive the main drive signal $U_{MAIN}$ 272 are open. The switching period $T_S$ 308 is the sum of the on-time $t_{ON}$ 304 and the off-time $t_{OFF}$ 306. In embodiments of the present invention, the main drive signal $U_{MAIN}$ 272 has substantially fixed on-time $t_{ON}$ 304, off-time $t_{OFF}$ 306, and switching period $T_S$ 308. As such, the duty ratio (the ratio of the on-time $t_{ON}$ 304 to the switching period $T_S$ 308) is also substantially fixed. In one embodiment of the present invention, the duty ratio is fixed at substantially 50%. In another embodiment, the duty ratio is substantially fixed at less than 50% to account for the time it takes for a switch to go from an ON state to an OFF state. In other words, the on-time $t_{ON}$ 304 is set to 50% of the switching period $T_S$ 308 minus the transition time of the switch to go from an ON state to an OFF state. Similar, the same transition time may be subtracted from the off-time $t_{OFF}$ 306.

Figure 4:
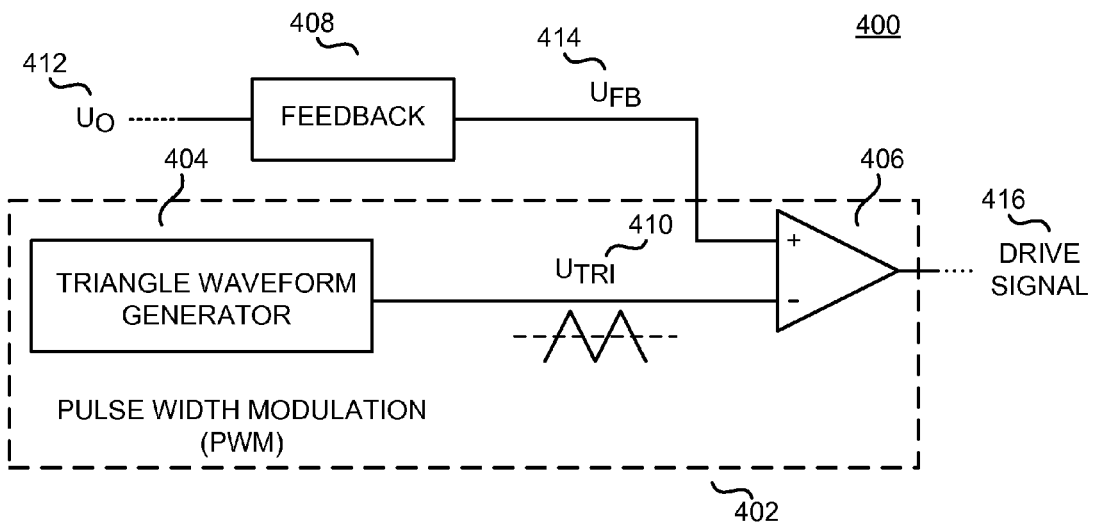
FIG. 4 is a diagram illustrating a controller, in accordance with an embodiment of the present invention.

FIG. 4 is a diagram illustrating a controller 400 utilizing pulse width modulator (PWM) 402 and including triangle waveform generator 404 and comparator 406. Although not shown, other components are also included in the controller 400. Further shown in FIG. 4 are feedback circuit 408, triangle waveform signal $U_{TRI}$ 410, output quantity $U_O$ 412, feedback signal $U_{FB}$ 414, and drive signal 416. Controller 400 is one example of a controller that may provide the second drive signal $U_B$ 280.

In the example of FIG. 4, PWM 402 includes triangle waveform generator 404 and comparator 406. The triangle waveform 410 is coupled to the inverting input of comparator 406 and produces triangle waveform signal $U_{TRI}$ 410. In one embodiment, triangle waveform signal $U_{TRI}$ 410 is a voltage signal. In another embodiment, a sawtooth waveform generator may be used instead of a triangle waveform generator. The feedback circuit 408 is coupled to the non-inverting input of comparator 406. It should be appreciated that the feedback circuit 408 may or may not be included in the controller 400. The feedback circuit 408 receives an output quantity $U_O$ 412 and the output quantity $U_O$ 412 may be a current signal or a voltage signal. The output quantity $U_O$ 412 is proportional to an output voltage, output current, or both. Feedback circuit 408 is coupled to sense the output quantity $U_O$ 412 from the power converter and produces the feedback signal feedback signal $U_{FB}$ 414. The feedback signal $U_{FB}$ 414 may be a voltage signal or a current signal. Feedback signal $U_{FB}$ 414 is representative of the output quantity $U_O$ 412 and is received at the non-inverting input of comparator 406. Comparator 406 then outputs the drive signal 416 to control switching of a switch.

In operation, when the feedback signal $U_{FB}$ 414 and the triangle waveform 410 are both voltage signals, the comparator 406 outputs a logic high value when the feedback signal $U_{FB}$ 414 is greater than the triangle waveform 410. On the other hand, the comparator 406 outputs a logic low value when the triangle waveform 410 is greater than the feedback signal $U_{FB}$ 414. Drive signal 416 may be one example of second drive signal $U_B$ 280. Further, output quantity $U_O$ 412 may be representative of the ac voltage $V_{AC1}$ 132 of the second power port 212.

Figure 5:
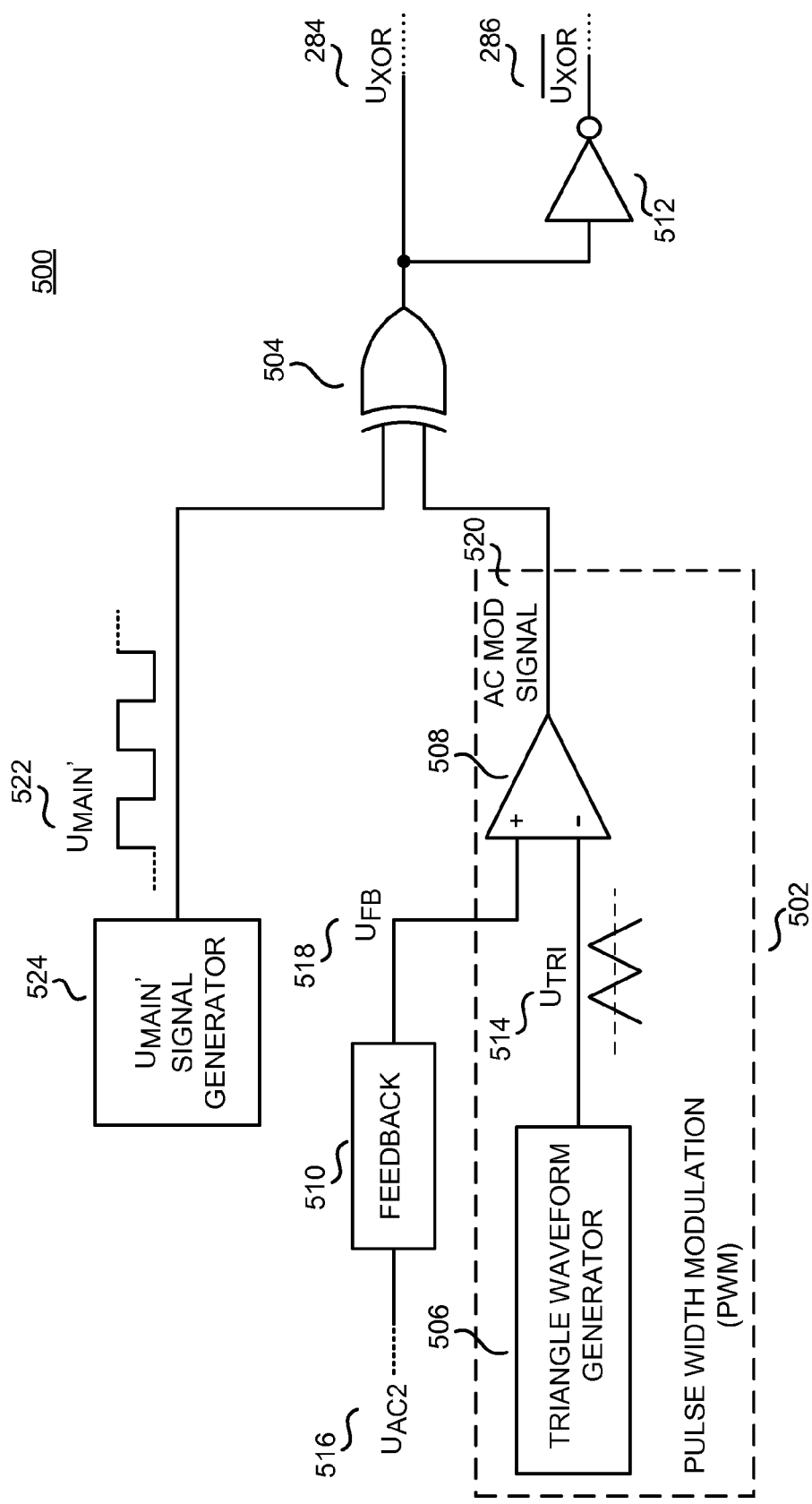
FIG. 5 is a diagram illustrating a controller utilizing XOR modulation, in accordance with an embodiment of the present invention.

FIG. 5 is a diagram illustrating a controller 500 utilizing XOR modulation including pulse width modulation (PWM) 502 and XOR-gate 504. Although not shown, other components are also included in the controller 500. The PWM 502 further includes triangle waveform generator 506 and comparator 508. Also shown in FIG. 5 are feedback circuit 510, inverter 512, triangle waveform signal $U_{TRI}$ 514, AC2 quantity $U_{AC2}$ 516, feedback signal $U_{FB}$ 518, ac modulation signal 520, main quantity $U_{MAIN}'$ 522, third drive signal $U_{XOR}$ 284 and inverted third drive signal $\overline{U_{XOR}}$ 286. Controller 500 is one example of a controller which may provide the third drive signal $U_{XOR}$ 284 and inverted third drive signal $\overline{U_{XOR}}$ 286 as shown with respect to FIG. 2. It should be appreciated that the feedback circuit 510 and the inverter 512 may or may not be included in the controller 500.

Controller 500 is one example of the spatial modulation referred to with respect to FIG. 2 and the third power converter 218. As mentioned above, a conventional bidirectional ac-to-ac power converter utilizes two stages of power converters, an ac-dc power converter followed by a dc-ac power converter. For the second stage, the control scheme utilized to control switching of the switches may be referred to as the ac modulation signal since the third power port 216 is an ac voltage line. Embodiments of the present invention simplify the conventional bidirectional ac-to-ac power converter by utilizing XOR modulation with a single stage of bridge rectifiers. Controller 500 is one example of modulating the ac modulation signal with a signal representative of the main drive signal $U_{MAIN}$ 272. As shown in FIG. 5, the ac modulation signal 520 is modulated with a signal representative of main drive signal $U_{MAIN}$ 272 (main quantity $U_{MAIN}'$ 522). The signal representative of main drive signal $U_{MAIN}$ 272 (main quantity $U_{MAIN}'$ 522) may be generated by a main quantity $U_{MAIN}'$ signal generator 524 within controller 500. In addition, the signal representative of main drive signal $U_{MAIN}$ 272 (main quantity $U_{MAIN}'$ 522) may or may not be synchronized with the main drive signal $U_{MAIN}$ 272. For simple power delivery systems, the main quantity $U_{MAIN}'$ 522 may be synchronized with the main drive signal $U_{MAIN}$ 272. For more complex power delivery systems with multiple main power ports and main port interfaces, the main quantity $U_{MAIN}'$ 522 may not be synchronized with the main drive signal $U_{MAIN}$ 272. Thus, in one embodiment, the transfer of power between the third power port 216 and winding 226 of energy transfer element 202 may be independent of the transfer of power between main power port 204 and energy transfer element 202 as well as independent of the transfer of power of the first power port 208 and second power port 212.

PWM 502, triangle waveform generator 506, comparator 508, and feedback circuit 510 coupled and function similarly to corresponding components shown in FIG. 4. Feedback circuit 510 receives the AC2 quantity $U_{AC2}$ 516. The AC2 quantity $U_{AC2}$ 516 may be a voltage signal or a current signal and in one example is representative of the ac voltage $V_{AC2}$ 132 of third power port 216. Feedback circuit 510 is coupled to sense the AC2 quantity $U_{AC2}$ 516 from the third power port 216 and produces the feedback signal feedback signal $U_{FB}$ 518. The feedback signal $U_{FB}$ 518 may be a voltage signal or a current signal. Feedback signal $U_{FB}$ 518 is representative of the AC2 quantity $U_{AC2}$ 516 and is received at the non-inverting input of comparator 508. The comparator receives the triangle waveform $U_{TRI}$ 514 from the triangle waveform generator 506 at the inverting input of comparator 508. The comparator 508 outputs the ac modulation signal 520. In other applications, the ac modulation signal 520 is equivalent to a drive signal to control switching of a switch. However, in embodiments of the present invention, the ac modulation signal 520 is further modulated with the main quantity $U_{MAIN}'$ 522 to produce third drive signal $U_{XOR}$ 284. By modulating the ac modulation signal 520 with the main quantity $U_{MAIN}'$ 522, the conventional bidirectional power converter may be simplified to only one H-bridge stage.

The output of comparator 508 couples to one input of XOR-gate 504 and receives the ac modulation signal 520. The other input of XOR-gate 504 is coupled to receive a signal representative of main drive signal $U_{MAIN}$ 272, main quantity $U_{MAIN}'$ 522. As shown, the output of the XOR-gate 504 is the third drive signal $U_{XOR}$ 284. In one example, further coupled to the output of the XOR-gate 504 is inverter 512. The inverter 512 receives the third drive signal $U_{XOR}$ 284 and outputs the inverted third drive signal $\overline{U_{XOR}}$ 286.

Figure 6:
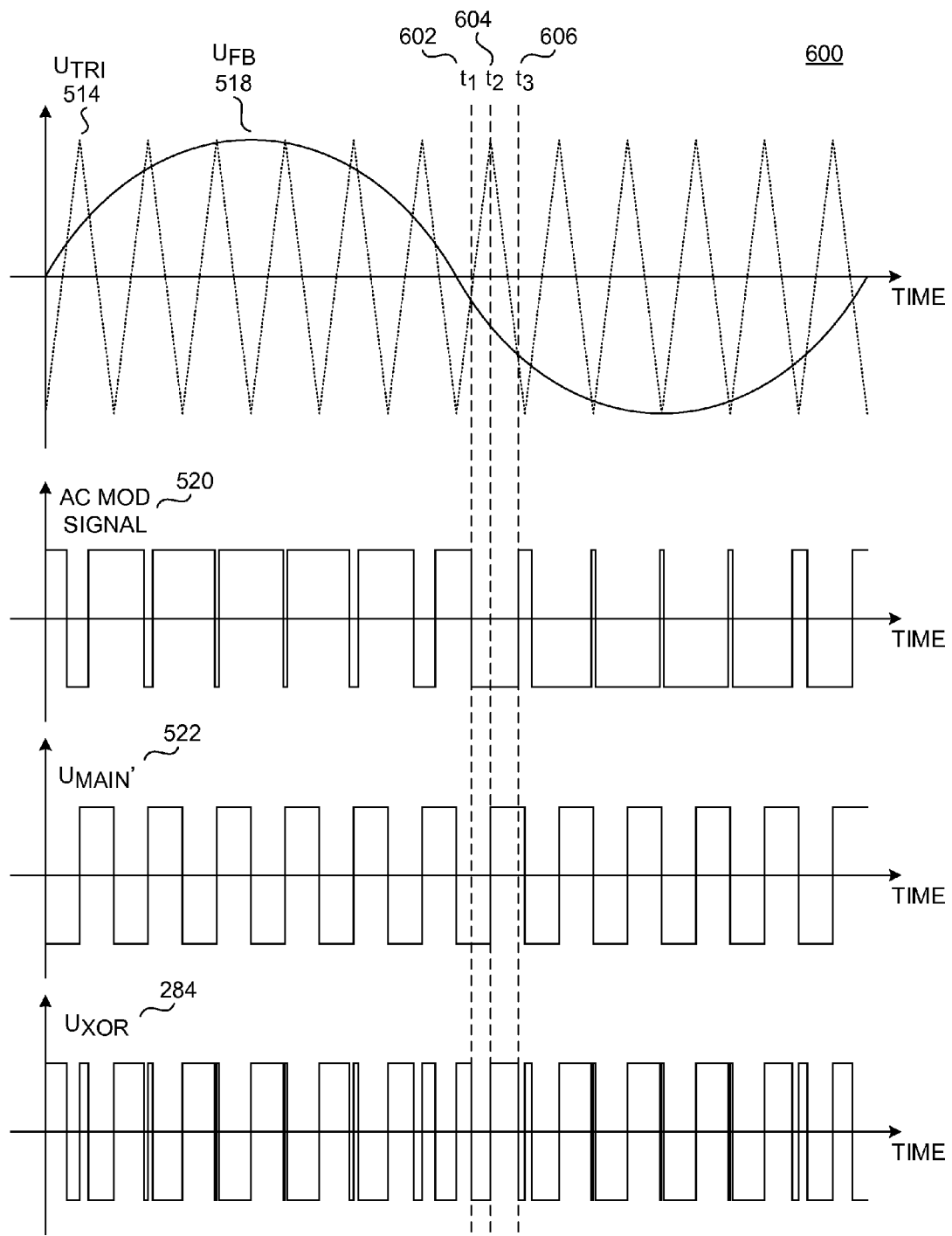
FIG. 6 is a timing diagram illustrating various waveforms of the power delivery system, in accordance with an embodiment of the present invention.

FIG. 6 is a timing diagram 600 illustrating various waveforms of the controller 500. Timing diagram 600 illustrates examples of the triangle waveform $U_{TRI}$ 514, feedback signal $U_{FB}$ 518, ac modulation signal 520, main quantity $U_{MAIN}'$ 522, and third drive signal $U_{XOR}$ 284.

As shown, the triangle waveform $U_{TRI}$ 514 is a waveform which oscillates between a positive and negative voltage and the feedback signal $U_{FB}$ 518 is a sinusoidal waveform. FIG. 6 illustrates one period of the feedback signal $U_{FB}$ 518. As mentioned above, feedback signal $U_{FB}$ 518 is representative of the ac voltage $V_{AC2}$ of the third power port 216. Between time $t_1$ 602 and time $t_2$ 604, the magnitude of the triangle waveform $U_{TRI}$ 514 is greater than the magnitude of the feedback signal $U_{FB}$ 518. As such, the ac modulation signal 520 (which is outputted from the comparator 508) is a logic low value. Between time $t_1$ 602 and time $t_2$ 604, the main quantity $U_{MAIN}'$ 522 (representative of main drive signal $U_{MAIN}$ 272) is at a logic low value. As a result, the output of the XOR-gate 504 and the third drive signal $U_{XOR}$ 284 is logic low.

Between time $t_2$ 604 and $t_3$ 606, the magnitude of the triangle waveform $U_{TRI}$ 514 is still greater than the magnitude of the feedback signal $U_{FB}$ 518 and the ac modulation signal 520 is a logic low value. However, the main quantity $U_{MAIN}'$ 522 transitions from a logic low value to a logic high value which results in the output of the XOR-gate 504 and third drive signal $U_{XOR}$ 284 to transition to a logic high value.

While the invention herein disclosed has been described by means of specific embodiments, examples and applications thereof, numerous modifications and variations could be made thereto by those skilled in the art without departing from the scope of the invention set forth in the claims.

What is claimed is:

1. A power delivery network for transferring power between multiple power ports, the power delivery network comprising:
    an energy transfer element having a first winding, a second winding, and a third winding, wherein a first power converter is to be coupled to transfer power between a first power port and the first winding, and wherein a second power converter is to be coupled to transfer power between the second winding and a second power port;
    a main power port to be coupled to a dc voltage; and
    a main port interface coupled between the main power port and the third winding to cyclically reverse the dc voltage and to provide a cyclically reversed voltage to the third winding at a fixed duty ratio, wherein the first power converter is to control the transfer of power between the first power port and the first winding independent of the transfer of power between the second winding and the second power port, and wherein the main power port has an effective impedance less than an effective impedance of the first power port and less than an effective impedance of the second power port.

2. The power delivery network of claim 1, wherein the main power port is a bidirectional power port and wherein the main power port is coupled to receive power from the third winding and to transfer power to the third winding.

3. The power delivery network of claim 1, wherein the main port interface includes a bridge having a plurality of switches coupled between the main power port and the third winding to cyclically reverse the dc voltage in response to a main control signal, wherein the main control signal has the fixed duty ratio.

4. The power delivery network of claim 1, wherein the energy transfer element includes a single magnetic core and wherein the first winding, the second winding, and the third winding are magnetically coupled to one another via the single magnetic core.

5. A power delivery network for transferring power between multiple power ports, the power delivery network comprising:
    an energy transfer element having a first winding, a second winding, and a third winding;
    a first power converter coupled to transfer power between a first power port and the first winding;
    a second power converter coupled to transfer power between the second winding and a second power port;
    a main power port to be coupled to a voltage; and
    a main port interface coupled between the main power port and the third winding to provide a cyclically reversed voltage to the third winding at a fixed duty ratio, wherein the first power converter controls the transfer of power between the first power port and the first winding independent of the transfer of power between the second winding and the second power port, and wherein the main power port has an effective impedance less than an effective impedance of the first power port and less than an effective impedance of the second power port.

6. The power delivery network of claim 5, wherein a voltage across the first winding and a voltage across the second winding are each substantially proportional to the cyclically reversed voltage of the third winding.

7. The power delivery network of claim 5, wherein the second power converter controls the transfer of power between the second winding and the second power port independent of the transfer of power between the first power port and the first winding.

8. The power delivery network of claim 5, wherein the first power converter comprises:
    a switch coupled to control the transfer of power between the first power port and the first winding in response to a drive signal; and
    a controller coupled to generate the drive signal to regulate an output of the first power converter independent of the second winding, independent of the second power port, and independent of the second power converter.

9. The power delivery network of claim 8, wherein the controller does not receive feedback information about the second winding, the second power port, and the second power converter.

10. The power delivery network of claim 5, wherein the first power port is a unidirectional power port and wherein the first power converter is coupled to transfer power only in the direction from the first power port to the first winding.

11. The power delivery network of claim 5, wherein the second power port is a unidirectional power port and wherein the second power converter is coupled to transfer power only in the direction from the second winding to the second power port.

12. The power delivery network of claim 5, wherein the second power port is a bidirectional power port and wherein the second power converter is a bidirectional power converter coupled to transfer power in a first direction from the second winding to the second power port and in a second direction from the second power port to the second winding.

13. The power delivery network of claim 5, wherein the second power converter is an ac to ac power converter and wherein the second power port provides an ac output voltage.

14. The power delivery network of claim 5, wherein the first power converter is a dc to ac power converter and wherein the first power port is to be coupled to receive a dc voltage.

15. The power delivery network of claim 5, wherein the main power port is a bidirectional power port and wherein the main power port is coupled to receive power from the third winding and to transfer power to the third winding.

16. The power delivery network of claim 5, wherein the main port interface includes a bridge having a plurality of switches coupled between the main power port and the third winding to cyclically reverse the voltage received at the main power port in response to a main control signal, wherein the voltage is a dc voltage.

17. The power delivery network of claim 16, wherein the main port interface further includes a controller coupled to provide the main control signal having the fixed duty ratio.

18. The power delivery network of claim 17, wherein the controller is coupled to provide the main control signal at the fixed duty ratio and at a fixed frequency.

19. The power delivery network of claim 5, wherein the main power port is to be coupled to an energy storage element to store power received from the energy transfer element and to provide stored power to the energy transfer element.

20. The power delivery network of claim 5, wherein the second power converter comprises:
    a pulse width modulator (PWM) coupled to receive a feedback signal representative of an output of the second power port, wherein the PWM is further coupled to generate a modulation signal; and
    an exclusive-or (XOR) logic circuit coupled to receive the modulation signal and coupled to receive a signal having the fixed duty ratio, wherein the XOR logic circuit is further coupled to output a drive signal to control the transfer of power between the second winding and the second power port in response to the modulation signal and the signal having the fixed duty ratio.

21. The power delivery network of claim 5, wherein the energy transfer element includes a single magnetic core and wherein the first winding, the second winding, and the third winding are magnetically coupled to one another via the single magnetic core.

22. A power delivery system comprising:
a first power port, a second power port and a main power port;
an electrical power generator coupled to provide power to the first power port;
an energy storage element coupled to the provide a dc voltage to the main power port;
a power delivery network for transferring power between the first power port, the second power port and the third power port, the network comprising:
an energy transfer element having a first winding, a second winding, and a third winding;
a first power converter coupled to transfer power between the first power port and the first winding;
a second power converter coupled to transfer power between the second winding and the second power port; and
a main port interface coupled between the main power port and the third winding to cyclically reverse the dc voltage and to provide a cyclically reversed voltage to the third winding at a fixed duty ratio, wherein the first power converter controls the transfer of power between the first power port and the first winding independent of the transfer of power between the second winding and the second power port, and wherein the main power port has an effective impedance less than an effective impedance of the first power port and less than an effective impedance of the second power port.

23. The power delivery system of claim 22, wherein a voltage across the first winding and a voltage across the second winding are each substantially proportional to the cyclically reversed voltage of the third winding.

24. The power delivery system of claim 22, wherein the second power converter controls the transfer of power between the second winding and the second power port independent of the transfer of power between the first power port and the first winding.

25. The power delivery system of claim 22, wherein the second power port is a bidirectional power port and wherein the second power converter is a bidirectional power converter coupled to transfer power in a first direction from the second winding to the second power port and in a second direction from the second power port to the second winding.

26. The power delivery system of claim 22, wherein the main power port is a bidirectional power port and wherein the main power port is coupled to receive power from the third winding and to transfer power to the third winding.

27. The power delivery system of claim 22, wherein the main port interface includes a bridge having a plurality of switches coupled between the main power port and the third winding to cyclically reverse the dc voltage in response to a main control signal, wherein the main control signal has the fixed duty ratio.

28. The power delivery system of claim 22, wherein the energy storage element includes a battery to store power received from the energy transfer element and to provide stored power to the energy transfer element.

29. The power delivery system of claim 22, wherein the second power converter comprises:
a pulse width modulator (PWM) coupled to generate a modulation signal in response to a feedback signal that is representative of an output of the second power port; and
an exclusive-or (XOR) logic circuit coupled to receive the modulation signal and coupled to receive a signal having the fixed duty ratio, wherein the XOR logic circuit is further coupled to output a drive signal to control the transfer of power between the second winding and the second power port in response to the modulation signal and the signal having the fixed duty ratio.

30. The power delivery system of claim 22, wherein the energy transfer element includes a single magnetic core and wherein the first winding, the second winding, and the third winding are magnetically coupled to one another via the single magnetic core.

31. The power delivery system of claim 22, wherein the electrical power generator includes a photovoltaic cell.

* * * * *